United States Patent Office 3,706,767
Patented Dec. 19, 1972

3,706,767
ACETIC ACID COMPOUNDS AND METHODS FOR THEIR PRODUCTION
James S. Kaltenbronn, Ann Arbor, Mich., assignor to Parke, Davis & Company, Detroit, Mich.
No Drawing. Filed June 23, 1971, Ser. No. 156,118
Int. Cl. C07d 63/22
U.S. Cl. 260—330.5      6 Claims

ABSTRACT OF THE DISCLOSURE

3 - (2 - thienyl)benzo[b]thiophene - 7 - acetic acids, 4 - (2 - thienyl)benzo[b]thiophene - 7 - acetic acids, and 7 - (2 - thienyl)benzo[b]thiophene - 4 - acetic acids, optionally substituted at the 5-position of the 2-thienyl group by bromine or chlorine and at the α-carbon position by methyl; carboxylate salts thereof; and their production by hydrolysis of a carboxylic acid precursor, reductive dehalogenation, or halogenation. The compounds of the invention are useful as anti-inflammatory agents.

SUMMARY AND DETAILED DESCRIPTION

The present invention relates to new acetic acid compounds that are useful as pharmacological agents and to methods for their production. More particularly, the invention relates to new (2-thienyl)benzo[b]thiopheneacetic acid compounds that can represented by the formula

$$\text{Ar—CH(R}_1\text{)—COOH} \quad\quad (I)$$

and to pharmaceutically-acceptable salts thereof; where $R_1$ is hydrogen or methyl and Ar represents a 3 - (2-thienyl)benzo[b]thiophene-7-group having the formula

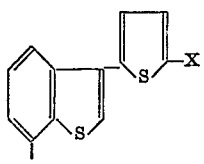

a 4 - (2 - thienyl)benzo[b]thiophene-7-group having the formula

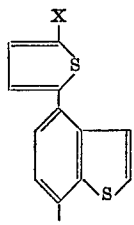

or a 7 - (2 - thienyl)benzo[b]thiophene-4-group having the formula

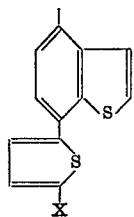

where X is hydrogen, bromine, or chlorine.

In accordance with the invention (2-thienyl)benzo[b] thiopheneacetic acid compounds having Formula I above and salts thereof are produced by hydrolyzing a compound that can be represented by the formula

$$\text{Ar—CH(R}_1\text{)—Y} \quad\quad (II)$$

where $R_1$ and Ar have the aforementioned significance and Y is a group hydrolyzable to a carboxyl group. Some examples of groups hydrolyzable to a carboxyl group are cyano, alkoxycarbonyl, aryloxycarbonyl, aralkoxycarbonyl, carbamoyl, alkyl-substituted carbamoyl, trihalomethyl, amidino, alkyl-substituted amidino, haloformyl,

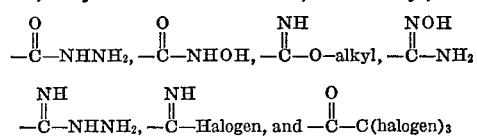

The precise nature of the group Y which is hydrolyzable to a carboxyl group is not critical because in carrying out the process it is converted to a carboxyl group. Therefore, if desired, the group Y can in appropriate cases contain one or more substituents such as lower alkyl, lower alkoxy, halogen, nitro, carboxy, or alkoxycarbonyl, and in those cases where the group Y is basic, it can also be employed in the form of an acid-addition salt. As used herein the term "group hydrolyzable to a carboxyl group" designates substituted as well as unsubstituted radicals. Compounds in which the group Y is the cyano group or an alkoxycarbonyl group are preferred starting materials in the process because they are quite readily available and are hydrolyzable to the carboxyl derivatives in high yields.

The hydrolysis can be carried out under either acidic or alkaline conditions, by the use of an acidic or basic hydrolytic agent. Alkaline conditions are preferred and should be used exclusively with certain of the Y groups, for example, with the

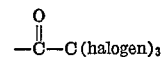

group. The hydrolysis can be carried out in water or in an aqueous solution of an unreactive, water-miscible, organic solvent such as an aliphatic alcohol, dioxane, tetrahydrofuran, ethylene glycol, propylene glycol or a lower alkyl ether of ethylene glycol or of diethylene glycol, to which has been added an acid or a base to render the medium acidic or alkaline. Some examples of suitable bases are alkali metal hydroxides, alkaline earth metal hydroxides, alkali metal carbonates, alkali metal alkoxides, and trialkylammonium hydroxides. Some examples of suitable acids are mineral acids, strong organic acids such as p-toluenesulfonic acid, and acidic ion exchange resins. Preferred agents are alkali metal hydroxides such as sodium hydroxide or potassium hydroxide. The hydrolytic agent is normally employed in considerable excess.

The hydrolysis is carried out by heating a solution or suspension of the starting material in a solvent medium containing an acid or a base until hydrolysis of the group Y is substantially complete. The required time and temperature will vary depending on the nature of the specific starting material of Formula II that is employed and on the basic or acidic agent used. In general, however, the reaction is carried out at a temperature between about 25° and 200° C., or at the reflux temperature of the solvent, with a reaction time of from one to 75 hours. When using one of the preferred basic hydrolytic agents, the reaction is usually carried out at a temperature between 60° and 125° C., and is substantially complete within less than 24 hours. When the hydrolysis is carried out under alkaline conditions, the product is present in the reaction mixture in the form of a salt; it can be isolated in this form, or following treatment with an acid, preferably a mineral acid, it can be isolated as the free acid. When the hydrolysis is carried out under acidic conditions, the product is present in the reaction mixture as the free acid, and it can be isolated directly in this form, or by subsequent treatment with a base, it can be isolated in salt form.

Starting materials required for use in the foregoing process are prepared by a variety of methods. For example, a 3-(5-halo-2-thienyl)benzo[b]thiophene-7-acetonitrile can be prepared by the following series of reactions. o-Thiocresol is reacted with 2-(bromoacetyl)thiophene in the presence of a base, and the (o-tolylthio) methyl 2-thienyl ketone product is cyclized by reaction with phosphorus pentoxide in phosphoric acid to give 7-methyl-3-(2-thienyl)benzo[b]thiophene, which in turn is reacted with a brominating or chlorinating agent to give a 3-(5-halo-2-thienyl)-7-methylbenzo[b]thiophene. This intermediate is next reacted with N-bromosuccinimide in the presence of a radical catalyst, such as dibenzoyl peroxide, to give a 3-(5-halo-2-thienyl)benzo[b]thiophene-7-methyl bromide, which is finally reacted with sodium cyanide to give the desired 3-(5-halo-2-thienyl)benzo[b] thiophene-7-acetonitrile starting material. A 3-(5-halo-2-thienyl)-α-methylbenzo[b]thiophene-7-acetonitrile is then obtained by reacting a 3-(5-halo-2-thienyl)benzo[b]thiophene-7-acetonitrile with a methylating agent, such as methyl iodide, in the presence of a strong base, such as sodium hydride.

The foregoing procedure as well as those used for the preparation of other starting materials required for the practice of the present invention are described in greater detail hereinafter.

Also in accordance with the invention, (2-thienyl) benzo[b]thiopheneacetic acid compounds that can be represented by the formula

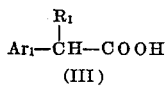

(III)

and salts thereof are produced by reacting a bromine-substituted (2-thienylbenzo[b]thiopheneactic acid that can be represented by the formula

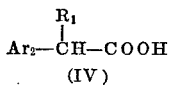

(IV)

or a salt thereof with gaseous hydrogen in the presence of a hydrogenation catalyst; where $R_1$ is as defined earlier, $Ar_1$ represents a 3-(2-thienyl)benzo[b]thiophene-7-group having the formula

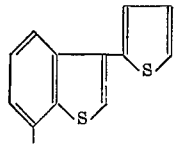

or a 4-(2-thienyl)benzo[b]thiophene-7-group having the formula

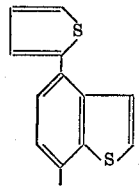

and $Ar_2$ represents a 3 - (5 - bromo-2-thienyl)benzo[b]-thiophene-7-group having the formula

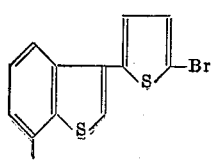

or a 4 - (5 - bromo-2-thienyl)benzo[b]thiophene-7- group having the formula

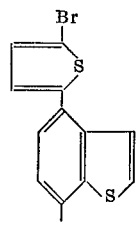

Hydrogenation catalysts that may be used include platinum, platinum oxide, palladium, and palladium oxide, which may optionally be supported on an inert carrier, such as charcoal. The preferred catalyst is palladium-on-charcoal. The reaction is best carried out in an unreactive solvent medium. Suitable solvents include water, for use with a salt starting material, aliphatic alkanols having not more than four carbon atoms, acetic acid, ethyl acetate, and tertiary amides, such as N,N-dimethylformamide and N,N-dimethylacetamide. The reaction is normally carried out in the presence of a base, which is preferably sodium acetate, although other bases, such as organic tertiary amines, for example, triethylamine, and alkaline earth metal oxides and hydroxides, for example, calcium oxide, calcium hydroxide, and barium hydroxide, may also be used. The reaction can conveniently be carried out at room temperature, or about 25° C., employing a hydrogen pressure of about 50 lbs./in.$^2$. Other temperatures, in the range of from 20 to 75° C., and varying hydrogen pressures, in the range of from 15 to 100 lbs./in.$^2$ may also be satisfactorily used. The duration of the reaction will vary, depending somewhat upon the temperature, the hydrogen pressure, and the amount of starting material, and is best determined by monitoring the adsorption of hydrogen during the course of the reaction. The reaction is complete when one molecular equivalent of hydrogen has been taken up. The product of the reaction may be obtained in either free acid or salt form, depending upon the form of the starting material used, or by appropriate adjustment of the pH of the reaction mixture.

Further in accordance with the invention (5-halo-2-thienyl)benzo[b]thiopheneacetic acid compounds that can be represented by the formula

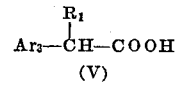

(V)

are produced by reacting a (2-thienyl)benzo[b]thiophene-acetic acid compound that can be represented by the formula

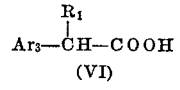

(VI)

with a halogenating agent; where $R_1$ is as defined previously, $Ar_3$ represents a 3 - (5-halo-2-thienyl)benzo[b]thiophene-7-group having the formula

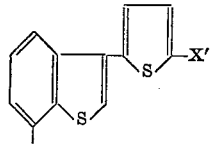

a 4-(5-halo-2-thienyl)benzo[b]thiophene-7-group having the formula

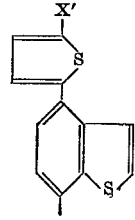

or a 7-(5-halo-2-thienyl)benzo[b]thiophene-4-group having the formula

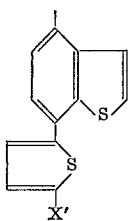

and Ar₄ represents a 3-(2-thienyl)benzo[b]thiophene-7-group having the formula

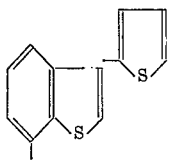

a 4-(2-thienyl)benzo[b]thiophene-7-group having the formula

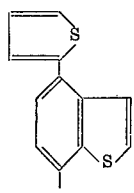

or a 7-(2-thienyl)benzo[b]thiophene-4-group having the formula

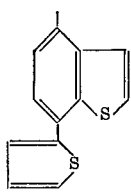

where X′ is bromine or chlorine. Halogenating agents that may be employed include chlorine, sulfuryl chloride, N-chloroacetamide, and hypochlorous acid for chlorination and bromine, N-bromosuccinimide, cyanogen bromide, and sulfuryl bromide for bromination. The preferred chlorinating agent is sulfuryl chloride and the preferred brominating agent is N-bromosuccinimide. The reaction is advantageously carried out in an unreactive solvent medium, which may be a lower alkanoic acid, such as acetic acid, or a chlorinated hydrocarbon, such as chloroform or tetrachloroethane. To insure rapid reaction and optimum yields, the reaction is preferably carried out in the presence of a radical catalyst, such as dibenzoyl peroxide or azobisisobutyronitrile, while the reaction mixture is irradiated with light. The temperature of the reaction is not critical and may be varied over a wide range, from 0 to 120° C. With the preferred halogenating agents, it is most convenient to carry out the reaction at the reflux temperature. The duration of the reaction likewise is not critical; at the usual temperatures employed, the reaction is essentially complete after a period of from 30 minutes to 3–4 hours. Approximately equivalent quantities of reactants are normally employed, although a slight excess of the halogenating agent is not harmful. The product of the reaction may be isolated in either free acid or salt form by appropriate adjustment of the pH of the reaction mixture.

The free carboxylic acid compounds of the invention, represented by Formula I above, form carboxylate salts with a variety of inorganic and organic bases. Pharmaceutically-acceptable salts are formed with such bases as sodium hydroxide, potassium hydroxide, calcium hydroxide, sodium carbonate, potassium bicarbonate, ammonia, diethylamine, 2-hydroxyethylamine, and chlorine. Pharmaceutically-acceptable magnesium and aluminum salts are formed by reacting the sodium salt or other soluble carboxylate salt with magnesium chloride or aluminum chloride in an aqueous medium. The preferred carboxylate salts of the invention are the salts of an alkali metal, an alkaline earth metal, aluminum, ammonia, or a substituted ammonia. The carboxylic acids and their salts are interconvertible by adjustment of the pH. They differ with respect to certain physical properties, such as solubility in polar solvents, but are otherwise equivalent for purposes of the invention.

If desired, the compounds of the invention wherein $R_1$ is methyl can also be obtained in optically active forms by resolving an optically inactive free acid final product by fractional crystallization of a salt formed with an optically active base.

The compounds of the invention are new chemical compounds that are useful as pharmacological agents, especially as anti-inflammatory agents. As such, they are of value in mitigating the symptoms associated with inflammatory conditions as well as in preventing or suppressing the occurrence of inflammation. Their anti-inflammatory activity is demonstrable and quantitatively measurable by means of a test designed to measure the ability of a compound to delay the normal appearance of an erythema in animals exposed to ultraviolet radiation under standardized conditions. The test procedure that is used has been described in Archives Internationales de Pharmacodynamie et de Therapie, Vol. 116, pages 261–292, 1958. This test has been found to be a reliable indicator of anti-inflammatory activity, as demonstrated, for example, for the known clinically useful agents, aminopyrine, antipyrine, and aspirin. The activities of some representative compounds of the present invention, as determined by this standard test procedure are tabulated below. In the table, the activities are expressed in terms of the minimum dose that was effective in delaying the appearance of an erythema.

ANTI-INFLAMMATORY ACTIVITY

| Compound: | Minimum effective dose, mg./kg. |
| --- | --- |
| 3 - (5 - bromo - 2 - thienyl)benzo[b]thiophene-7-acetic acid | 3.1 |
| 4 - (5 - bromo - 2 - thienyl)benzo[b]thiophene-7- acetic acid | 3.1 |
| 7-(2-thienyl)benzo[b]thiophene-4-acetic acid | 0.8 |
| α - Methyl - 7 - (2 - thienyl)benzo[b]thiophene-4-acetic acid | 0.8 |
| 3-(2-thienyl)benzo[b]thiophene-7-acetic acid | 0.4 |
| 4-(2-thienyl)benzo[b]thiophene-7-acetic acid | 0.8 |
| 4 - (5 - chloro - 2 - thienyl)benzo[b]thiophene-7-acetic acid | 3.1 |

The compounds of the invention are preferably administered by the oral route although parenteral administration can also be used. They can be employed in either free acid or salt form and can be combined with either a solid or liquid carrier or diluent and made available in varying amounts in such pharmaceutical forms as tablets, capsules, powders, and aqueous and non-aqueous suspensions and solutions.

The invention is illustrated by the following examples.

EXAMPLE 1

To a solution of 5.7 g. of 3-(5-bromo-2-thienyl)-benzo[b]thiophene-7-acetonitrile in 60 ml. of ethanol and 30 ml. of dioxane is added a solution of 5.7 g. of potassium hydroxide in 30 ml. of water, and the resulting mixture is heated under reflux overnight and evaporated under reduced pressure. The residue is mixed with water and the aqueous mixture is washed well with ether and acidified with dilute hydrochloric acid to precipitate 3-(5-bromo-2-thienyl)benzo[b]thiophene-7-acetic acid, which is isolated and dried; M.P. 154.5–156.5° C., following three crystallizations from benzene.

Utilizing the foregoing procedure with the substitution of 5.9 g. of 3-(5-bromo-2-thienyl)-α-methylbenzo[b]thiophene-7-acetonitrile for the 3-(5-bromo-2-thienyl)benzo[b]thiophene-7-acetonitrile, there is obtained 3-(5-bromo-2-thienyl)-α-methylbenzo[b]thiophene-7-acetic acid.

The starting materials used above are prepared as described in the following.

To a solution of 17.8 g. of sodium methoxide in 300 ml. of methanol is added first 41.0 g. of o-thiocresol, and then, after 5 minutes, 62.5 g. of 2-(bromoacetyl)-thiophene. The resulting mixture is heated under reflux for one hour and is then evaporated under reduced pressure. The residue is dissolved in ether and the ethereal solution is washed with water until neutral, dried, and evaporated to dryness under reduced pressure to give (o-tolylthio) methyl 2-thienyl ketone, a yellow oil that is purified by distillation; B.P. 133–155° C./0.20–0.25 mm. Hg.

To a stirred mixture of 480 g. of phosphorus pentoxide and 365 ml. of phosphoric acid at 60° C. is carefully added 58 g. of (o-tolylthio)methyl 2-thienyl ketone, and the resulting mixture is stirred for three hours at 70–75° C. and then poured into water. The aqueous mixture is extracted with ether and the ether extract is washed with water, with saturated aqueous sodium bicarbonate, and with water again until neutral, dried, and evaporated to dryness under reduced pressure. The dark, oily residue is dissolved in a small amount of benzene and the benzene solution is poured onto a column of basic alumina. The alumina column is eluted with benzene and the benzene eluates are evaporated to give 7-methyl-3-(2-thienyl)benzo[b]thiophene, which is purified by distillation; the product is collected between 118 and 160° C. at 0.2–0.3 mm. Hg.

To a solution of 37.1 g. of 7-methyl-3-(2-thienyl)benzo[b]thiophene in 400 ml. of carbon tetrachloride is added 28.7 g. of N-bromosuccinimide and 200 mg. of dibenzoyl peroxide, and the resulting mixture is heated under reflux for one hour while it is irradiated with light from a flood lamp. To the mixture is then added 10 drops of 48% hydrobromic acid and after it is heated under reflux for two more hours, the mixture is filtered. The filtrate is washed with 5% aqueous sodium hydroxide and with water until neutral, dried, and evaporated. The dark, oily residue is dissolved in benzene and the benzene solution is purified by chromatography on basic alumina to give upon evaporation of the benzene solvent used for elution 3-(5-bromo-2-thienyl)-7-methylbenzo[b]thiophene; M.P. 56.5–59° C.

To a solution of 25.1 g. of 3-(5-bromo-2-thienyl)-7-methylbenzo[b]thiophene in 250 ml. of carbon tetrachloride is added 15.1 g. of N-bromosuccinimide and 100 mg. of dibenzoyl peroxide, and the resulting mixture is heated under reflux for six hours while it is irradiated with light from a flood lamp. It is then filtered and the filtrate is washed twice with 5% aqueous sodium hydroxide and with water until neutral, dried, and evaporated to give 3-(5-bromo-2-thienyl)benzo[b]thiophene-7-methyl bromide; M.P. 102–105° C., following crystallization from hexane.

A mixture consisting of 17.3 g. of 3-(5-bromo-2-thienyl)benzo[b]thiophene-7-methyl bromide, 2.45 g. of sodium cyanide, 170 ml. of acetone, 100 ml. of ethanol, and 20 ml. of water is heated under reflux for four hours and then concentrated to remove the solvent. The residue is dissolved in chloroform and the chloroform solution is washed with water until neutral, dried, and evaporated to dryness under reduced pressure. The oily residue is stirred well with hot acetonitrile, the resulting mixture is filtered, and the filtrate is evaporated to give an oily residue of 3-5 - bromo - 2 - thienyl)benzo[b]thiophene-7-acetonitrile; M.P. 100–102.5° C., following crystallization from benzene-hexane.

To a suspension of 1.6 g. of 53.4% sodium hydride in mineral oil dispersion in 15 ml. of dimethyl sulfoxide under nitrogen is added a solution of 10.7 g. of 3-(5-bromo - 2-thienyl)benzo[b]thiophene-7-acetonitrile in 55 ml. of dimethyl sulfoxide while the reaction temperature is maintained below 35° C. The resulting mixture is stirred at room temperature for five hours, 9.1 g. of methyl iodide is added while the temperature is kept below 25° C., and the reaction mixture is stirred under nitrogen at room temperature overnight. It is then decomposed by treatment with dilute acetic acid and the acetic acid mixture is extracted with ether. The ether extract is washed with water, with saturated aqueous sodium bicarbonate, and with water again, dried, and evaporated to give 3-(5-bromo - 2-thienyl)-α-methylbenzo[b]thiophene-7-acetonitrile, suitable for use without further purification.

EXAMPLE 2

To a solution of 28.8 g. of 4-(5-bromo-2-thienyl)-benzo[b]thiophene-7-acetonitrile in 290 ml. of ethanol and 60 ml. of dioxane is added a solution of 30 g. of potassium hydroxide in 120 ml. of water, and the resulting mixture is heated under reflux overnight and evaporated under reduced pressure. The residue is mixed well with water and the aqueous mixture is washed with ether and acidified with dilute hydrochloric acid. The acidified mixture is then extracted with ether and the ether extract is washed with water and dried. The dried solution is then evaporated and the residue obtained is purified by chromatography on a silica gel column. The eluates obtained by eluting the column with a 10% ether-in-benzene mixture are combined and evaporated to give a solid residue of 4 - (5 - bromo-2-thienyl)benzo[b]thiophene-7-acetic acid, which is purified by repeated crystallization from benzene; M.P. 159–160.5° C.

Utilizing the foregoing procedure, with the substitution of 30.0 g. of 4-(5-bromo-2-thienyl)-α-methylbenzo[b]thiophene-7-acetonitrile for the 4-(5-bromo-2-thienyl)benzo[b]thiophene-7-acetonitrile, there is obtained 4-(5-bromo - 2 - thienyl)-α-methylbenzo[b]thiophene-7-acetic acid.

The starting materials are prepared as described in the following.

A mixture consisting of 116 g. of ethyl β-methyl-2-thiopheneacrylate, 5 g. of 20% palladium-on-charcoal, and one liter of methanol is shaken at 27° C. with hydrogen at an initial pressure of 50 lbs./in.$^2$. After one molar equivalent of hydrogen is adsorbed, the mixture is filtered and the filtrate is concentrated to yield ethyl 3-(2-thienyl) butyrate; B.P. 63–69° C./0.2–0.3 mm. Hg.

To a suspension of 15.1 g. of lithium aluminum hydride in 300 ml. of ether is added dropwise a solution of 78.7 g. of ethyl 3-(2-thienyl)butyrate in 400 ml. of ether, and the resulting mixture is heated under reflux for one hour. It is then decomposed by treatment with ethyl acetate and with water, and the organic phase is separated, washed with saturated aqueous sodium chloride, dried, and evaporated to give an oily residue of 3-(2-thienyl)butan-1-ol, which is purified by distillation; the product is collected between 70 and 83° C. at 0.2–0.3 mm. Hg.

To a solution of 59.1 g. of 3-(2-thienyl)butan-1-ol in 300 ml. of ether, cooled in an ice-water bath, is added dropwise a solution of 37.4 g. of phosphorus tribromide in 100 ml. of ether, and the resulting mixture is stirred at room temperature overnight. The ethereal phase is decanted from a gummy residue, washed with water, with 5% aqueous sodium hydroxide, and with water again until neutral, dried, and evaporated to give a residue of 3-(2-thienyl)butyl bromide, which is purified by distillation; the product is collected between 64 and 80° C. at 0.2–0.4 mm. Hg.

A mixture consisting of 56.9 g. of 3-(2-thienyl)butyl bromide, 14.2 g. of sodium cyanide, 200 ml. of acetone, 200 ml. of ethanol, and 75 ml. of water is heated under reflux overnight and then concentrated to remove the solvent. The residue is dissolved in ether and the ether solution is washed with water until neutral, dried, and concentrated to give an oily residue of 4-(2-thienyl)-valeronitrile, which is suitable for use without further purification.

A mixture consisting of 39.2 g. of 4-(2-thienyl)valeronitrile, 39.2 g. of potassium hydroxide, 200 ml. of water, and 400 ml. of ethanol is heated under reflux overnight and then evaporated. The residue is mixed with water and the aqueous mixture is washed with ether and acidified with dilute hydrochloric acid. The acidified mixture is extracted with ether and the ether extract is washed with water, dried, and evaporated to give an oily residue of 4-(2-thienyl)valeric acid, which is suitable for use without further purification.

To a solution of 36.6 g. of 4-(2-thienyl)valeric acid in 60 ml. of trifluoroacetic acid is added dropwise 41.8 g. of trifluoroacetic acid anhydride, and the resulting mixture is heated under reflux for eight hours and evaporated. The residue is dissolved in ether and the ethereal solution is washed twice with 2.5% aqueous sodium hydroxide and with water until neutral, dried, and evaporated to give a residue of 7-methyl - 6,7 - dihydrobenzo[b]thiophene-4-(5H)-one, which is purified by distillation; B.P. 93–95° C./0.8–1.1 mm. Hg.

To a solution of 2-thiophene magnesium bromide (prepared from 33.6 g. of 2-bromothiophene, 5.1 g. of magnesium, and 100 ml. of ether) is added dropwise a solution of 31.3 g. of 7-methyl-6,7-dihydrobenzo[b]thiophen-4(5H)-one in 300 ml. of ether, and the resulting mixture is heated under reflux for one hour. The mixture is then hydrolyzed by adding dilute hydrochloric acid and heating the acidic mixture under reflux for one hour. The organic phase is separated, washed with water, with saturated aqueous sodium bicarbonate, and with water again until neutral, dried, and evaporated to give an oily residue of 7-methyl - 4 - (2-thienyl)-6,7-dihydrobenzo[b]thiophene, which is suitable for use without further purification.

A mixture of 46.7 g. of 7-methyl-4-(2-thienyl)-6,7-dihydrobenzo[b]thiophene and 6.8 g. of sulfur is heated at 196–220° C. for one hour, cooled, and dissolved in benzene. The benzene solution is poured onto a basic alumina chromatography column and the column is eluted with benzene. The benzene eluates are combined and evaporated to give an oily residue of 7-methyl-4-(2-thienyl)-benzo[b]thiophene, which is further purified by distillation; the product is collected between 120 and 200° C. at 0.29–0.4 mm. Hg.

To a solution of 37.1 g. of 7-methyl-4-(2-thienyl)-benzo[b]thiophene in 300 ml. of carbon tetrachloride is added 28.7 g. of N-bromosuccinimide and 200 mg. of dibenzoyl peroxide, and the resulting mixture is heated under reflux for three hours while it is irradiated with light from a flood lamp. It is then filtered and the filtrate is washed with 5% aqueous sodium hydroxide and with water until neutral, dried, and evaporated to give an oily residue of 4-(5-bromo-2-thienyl)-7-methylbenzo[b]thiophene, suitable for use without additional purification.

To a solution of 49.2 g. of 4-(5-bromo-2-thienyl)-7-methylbenzo[b]thiophene in 490 ml. of carbon tetrachloride is added 29.7 g. of N-bromosuccinimide and 300 mg. of dibenzoyl peroxide, and the resulting mixture is heated under reflux for one hour while it is irradiated with light from a flood lamp. To the mixture is then added 5 drops of 48% hydrobromic acid and after it is heated under reflux overnight, the mixture is filtered. The filtrate is washed with 5% aqueous sodium hydroxide and with water until neutral, dried, and evaporated to give an oily residue of 4 - (5 - bromo-2-thienyl)benzo[b]thiophene-7-methyl bromide, which can be used without further purification. A solution of this intermediate (61.8 g.) in 220 ml. of acetone is mixed with a solution of 9.3 g. of sodium cyanide in 50 ml. of water, and the resulting mixture is heated under reflux for six hours and evaporated. The residue is dissolved in ether and the ethereal solution is washed with water, dried, and evaporated to dryness to give 4 - (5 - bromo - 2 - thienyl)benzo[b]thiophene - 7 - acetonitrile, obtained as an oil that is suitable for use without further purification.

A solution of 10.7 g. of 4-(5-bromo-2-thienyl)benzo[b]thiophene-7-acetonitrile in 55 ml. of dimethyl sulfoxide is added dropwise to a suspension of 1.6 g. of 53.4% sodium hydride in mineral oil dispersion in 15 ml. of dimethyl sulfoxide under nitrogen while the temperature of the reaction is maintained below 35° C. The resulting mixture is stirred at room temperature for five hours, 9.1 g. of methyl iodide is added dropwise while the temperature is kept below 25° C., and the resulting mixture is stirred under nitrogen at room temperature overnight. It is then decomposed by treatment with dilute acetic acid and the acetic acid mixture is extracted with ether. The ether extract is washed with water, with saturated aqueous sodium bicarbonate, and with water again, dried, and evaporated to dryness to give the desired 4-(5-bromo-2-thienyl) - α - methylbenzo[b]thiophene - 7 - acetonitrile starting material.

EXAMPLE 3

A solution of 6.7 g. of potassium hydroxide in 30 ml. of water is added to a solution of 6.7 g. of ethyl 7-(2-thienyl)benzo[b]thiophene-4-acetate in 75 ml. of ethanol, and the resulting mixture is heated under reflux for two hours and then evaporated under reduced pressure. The residue is mixed with water, and the aqueous mixture is washed with ether and acidified with dilute hydrochloric acid. The acidified mixture is extracted with ether and the ether extract is washed with water, dried, and evaporated under reduced pressure. The dark, solid residue that is obtained is purified by chromatography on a silica gel column. The column is eluted with a 10% ether-in-benzene solvent mixture and the combined eluates are evaporated to give 7-(2-thienyl)benzo[b]thiophene-4-acetic acid, which is purified initially by sublimation; the fraction collected at 138–154° C. at 0.2 mm. Hg is further purified by crystallization from benzene; M.P. 158–159° C.

The ethyl 7-(2-thienyl)benzo[b]thiophene-4-acetate starting material is obtained as follows.

To a mixture consisting of 100 g. of 2-thienyl ketone, 174 g. of ethyl bromoacetate, 67.5 g. of acid-washed zinc and one liter of benzene is added a crystal of iodine, and the resulting mixture is heated under reflux overnight. It is then cooled and decomposed by adding dilute hydrochloric acid and heating the acidic mixture under reflux for one hour. The organic phase is separated, washed with water, with saturated aqueous sodium bicarbonate, and with water again until neutral, dried, and evaporated under reduced pressure. The dark oily residue is distilled and the fraction collected between 224 and 255° C. at 1.3–3.0 mm. Hg is dissolved in 800 ml. of anhydrous ethanol. To the ethanolic solution is added 21 g. of (carboxymethyl)trimethylammonium chloride hydrazide (Girard's Reagent T) and 21 ml. of acetic acid, and the resulting mixture is heated under reflux for one hour. Ethylene glycol (800 ml.) is added, and the resulting solution is concentrated under reduced pressure to remove the ethanol. The concentrated ethylene glycol solution is extracted with ether, and the ether extract is washed with water, with saturated aqueous sodium bicarbonate, and with water again until neutral, dried, and evaporated to give ethyl 3,3-di(2-thienyl)acrylate, obtained as an oil that is suitable for use without further purification.

To a solution of 65 g. of ethyl 3,3-di(2-thienyl)-acrylate in 650 ml. of ethanol is added a solution of 65 g. of potassium hydroxide in 325 ml. of water, and the resulting mixture is heated under reflux for one hour and evaporated under reduced pressure. The residue is mixed with water and the aqueous mixture is washed with ether and acidified with dilute hydrochloric acid to precipitate 3,3-di(2-thienyl)acrylic acid; M.P. 124–128° C., following crystallization from benzene-hexane.

To a solution of 37.8 g. of 3,3-di(2-thienyl)-acrylic acid in 230 ml. of N,N-dimethylformamide is added 11.0 g. of potassium carbonate and 28.4 g. of methyl iodide, and the resulting mixture is heated at 100° C. for three hours, cooled, and poured into water. The aqueous mixture is extracted with ether and the ether extract is washed with water until neutral, dried, and evaporated to dryness to give an oily residue of methyl 3,3-di(2-thienyl)acrylate, which is purified by distillation; the fraction that distills between 185 and 213° C. at 1.0–1.9 mm. Hg is collected for further use.

A mixture of 42.1 g. of methyl 3,3-di(2-thienyl) acrylate, 5 g. of 20% palladium on diatomaceous earth (Supercel), and 250 ml. of methanol is shaken at room temperature with hydrogen at an initial pressure of 52 lbs./in.$^2$ until one molar equivalent of hydrogen is adsorbed. The mixture is then filtered to remove the catalyst and the filtrate is evaporated to give an oily residue of methyl 3,3-di(2-thienyl)propionate, which is purified by distillation; the fraction that distills between 126 and 180° C. at 0.2 mm. Hg is collected.

To a suspension of 3.8 g. of lithium aluminum hydride in 100 ml. of ether is added dropwise a solution of 24.1 g. of methyl 3,3-di(2-thienyl)propionate in 125 ml. of ether and the resulting mixture is heated under reflux for one hour, cooled, and decomposed by treatment with ethanol and with water. The organic phase is separated, washed with saturated aqueous sodium bicarbonate, dried, and evaporated to give a residue of 3,3-di(2-thienyl)propanol, which is purified by distillation; the fraction that distills between 132 and 182° C. at 0.2 mm. Hg is collected.

To a solution of 19.0 g. of 3,3-di(2-thienyl)propanol in 400 ml. of ether is added dropwise a solution of 8.1 g. of phosphorus tribromide in 50 ml. of ether, and the resulting mixture is stirred at room temperature overnight. The ethereal solution is separated by decantation from a green residue and is washed with water, with 5% aqueous potassium hydroxide, and with water again until neutral, dried, and evaporated to give an oily residue of 3,3-di(2-thienyl) propyl bromide that is suitable for use without further purification.

To a solution of 17.4 g. of 3,3-di(2-thienyl)propyl bromide in 16 ml. of acetone and 16 ml. of ethanol is added a solution of 3.3 g. of sodium cyanide in 15 ml. of water, and the resulting mixture is heated under reflux overnight and evaporated under reduced pressure. The residue is dissolved in ether and the ethereal solution is washed with water, dried, and evaporated to give 4,4-di-(2-thienyl)butyronitrile. This intermediate (13.6 g.) is dissolved in 140 ml. of ethanol and to the solution is added a solution of 13.6 g. of potassium hydroxide in 70 ml. of water. The resulting mixture is heated under reflux overnight, evaporated under reduced pressure, and the residue obtained is mixed with water. The aqueous mixture is washed with ether, acidified with dilute hydrochloric acid, and the acidified mixture is extracted with ether. The ether extract is washed with water, dried, and evaporated to dryness to give an oily residue of 4,4-di(2-thienyl) butyric acid, which forms a solid upon standing; M.P. 58–59.5° C., following successive crystallizations from aqueous ethanol and cyclohexane.

A mixture consisting of 6.5 g. of 4,4-di(2-thienyl) butyric acid, 30 ml. of thionyl chloride, and 80 ml. of benzene is heated under reflux overnight and evaporated under reduced pressure. The residue is dissolved in 500 ml. of benzene and to the benzene solution, cooled in an ice-water bath, is added dropwise 6.7 g. of stannic chloride. The reaction mixture is kept at the ice-water bath temperature for one hour and at room temperature for two hours and is then decomposed with dilute hydrochloric acid. The organic phase is separated, washed with water, with 2.5% aqueous sodium hydroxide, and with water again until neutral, dried, and evaporated to give an oily residue of 7-(2-thienyl)-6,7-dihydrobenzo[b] thiophen-4(5H)-one, which is purified by distillation; the fraction that distills between 150 and 200° C. at 0.1 to 0.2 mm. Hg is collected for use in the next step.

To a mixture consisting of 5.9 g. of 7-(2-thienyl)-6,7-dihydrobenzo[b]thiophen-4(5H)-one, 5.0 g. of ethyl bromoacetate, 2.0 g. of acid-washed zinc, and 75 ml. of benzene is added a crystal iodine, and the mixture is heated under reflux for two hours. An additional 1.0 g. of zinc and 2 ml. of ethyl bromoacetate is then added and the reaction mixture is further heated under reflux overnight. Upon cooling, it is decomposed by adding dilute hydrochloric acid and heating the acidic mixture under reflux for one hour. The organic phase is separated, washed with water, with saturated aqueous sodium bicarbonate, and with water again until neutral, dried, and evaporated to dryness to give an oily residue that is dissolved in 270 ml. of anhydrous ethanol. To the ethanolic solution is added 2 g. of (carboxymethyl)trimethylammonium chloride hydrazide and 2 ml. of acetic acid, and the resulting mixture is heated under reflux for one hour. Ethylene glycol (150 ml.) is added and the mixture is concentrated to remove the ethanol. The concentrated solution is then extracted with ether and the ether extract is washed with water, with saturated aqueous sodium bicarbonate, and with water again until neutral, dried, and evaporated to give ethyl 7-(2-thienyl)-6,7-dihydrobenzo[b]thiophene-4-acetate obtained as an oil that is suitable for use without further purification. This intermediate (6.7 g.) is mixed with 0.74 g. of sulfur and the mixture is heated at 170° C. for one hour to give ethyl 7-(2-thienyl)benzo[b]thiophene-4-acetate, which is used above as the starting material without any additional purification.

EXAMPLE 4

To a solution of ethyl α-methyl-7-(2-thienyl)-benzo[b] thiophene-4-acetate (obtained from 3.5 g. of ethyl α-methyl-7-(2-thienyl)-6,7-dihydrobenzo[b]thiophene - 4 - acetate as described below) in 40 ml. of ethanol is added a solution of 4.0 g. of potassium hydroxide in 20 ml. of water, and the resulting mixture is heated under reflux for two hours and evaporated under reduced pressure. The residue is mixed with water and the aqueous mixture is washed with ether and acidified with dilute hydrochloric acid. The acidified mixture is extracted wth ether, and the ether extract is washed with water, dried, and evaporated to give a residue of α-methyl-7-(2-thienyl)benzo [b]thiophene-4-acetic acid, which is purified by chromatography on silica gel. The column is eluted with a 5% ether-in-benzene solvent mixture and the eluates are combined and evaporated to give the product, which is further purified by sublimation at 125° C. at 0.1 mm. Hg and crystallization from aqueous ethanol; M.P. 158–160° C.

The starting material used above is obtained as follows. To a mixture consisting of 2.6 g. of 7-(2-thienyl)-6,7-dihydrobenzo[b]thiophen-4(5H)-one, 4.0 g. of ethyl α-bromopropionate, 1.4 g. of acid-washed zinc, and 50 ml. of benzene is added a crystal of iodine, and the mixture is heated under reflux overnight. Upon cooling, it is decomposed with dilute hydrochloric acid and the acidic mixture is heated under reflux for one hour. The organic phase is separated, washed with water, with saturated aqueous sodium bicarbonate, and with water again until neutral, dried, and evaporated to give an oily residue of ethyl α-methyl-7-(2-thienyl)-6,7 - dihydrobenzo[b]thiophene-4-acetate, which is used directly without further purification. This intermediate (3.5 g.) is mixed with 0.42 g. of sulfur and the mixture is heated at 210° C. for 30 minutes to give the ethyl α-methyl-7-(2-thienyl)benzo [b]thiophene-4-acetate starting material.

EXAMPLE 5

A mixture consisting of 2.03 g. of 3-(5-bromo-2-thienyl)benzo[b]thiophene-7-acetic acid, 1.3 g. of sodium acetate trihydrate, 0.42 g. of 20% palladium-on-charcoal, and 250 ml. of ethanol is shaken at room temperature with hydrogen at an initial pressure of 50 lbs./in.$^2$ until one molar equivalent of hydrogen is adsorbed (about 20 minutes). The mixture is filtered and the filtrate is concentrated to a small volume under reduced pressure. The concentrated solution is then diluted with water and the solid 3-(2-thienyl)benzo[b]thiophene-7-acetic acid that precipitates is isolated, dried, and crystatllized from benzene-hexane; M.P. 161.5–163.5° C.

To a solution of 2.74 g. of 3-(2-thienyl)benzo[b]thiophene-7-acetic acid in 10 ml. of ethanol is added 10 ml. of 1.0 N aqueous sodium hydroxide, and the resulting solution is evaporated to dryness under reduced pressure to give sodium 3-(2-thienyl)benzo[b]thiophene-7-acetate.

To a warm solution of 2.97 g. of sodium 3-(2-thienyl) benzo[b]thiophene-7-acetate in 50 ml. of methanol is added with stirring a solution of 1.4 g. of choline chloride in 10 ml. of methanol. The resulting mixture is stirred for one hour, filtered to remove the insoluble sodium chloride and the filtrate is evaporated to dryness under reduced pressure to give 3-(2-thienyl)benzo[b]thiophene-7-acetic acid choline salt.

Utilizing the first procedure given above, with the substitution of 2.13 g. of 3-(5-bromo-2-thienyl)-α-methyl-benzo[b]thiophene-7-acetic acid for the 3-(5-bromo-2-thienyl)benzo[b]thiophene-7-acetic acid, there is obtained α-methyl-3-(2-thienyl)benzo[b]thiophene-7-acetic acid.

EXAMPLE 6

A mixture consisting of 6.5 g. of 4-(5-bromo-2-thienyl) benzo[b]thiophene-7-acetic acid, 2.5 g. of sodium acetate trihydrate, 1.0 g. of 20% palladium-on-charcoal, and 250 ml. of ethanol is shaken at room temperature with hydrogen at an initial pressure of 50 lbs./in.$^2$ until hydrogen adsorption ceases (about 8 minutes). The mixture is filtered, the filtrate is concentrated to a small volume under reduced pressure, and the concentrated solution is diluted with water. The solid 4-(2-thienyl)benzo[b]thiophene-7-acetic acid that precipitates is isolated, dried, and crystallized from benzene; M.P. 160–162° C.

EXAMPLE 7

To a solution of 2.31 g. of 4-(2-thienyl)benzo[b]thiophene-7-acetic acid in 25 ml. of acetic acid is added 1.14 g. of sulfuryl chloride and the resulting solution is stirred and heated under reflux for 2.5 hours while being irradiated with a floodlight. The solution is then cooled and poured into water and the solid 4-(5-chloro-2-thienyl) benzo[b]thiophene-7-acetic acid that precipitates is isolated and dried; M.P. 143.5–144.5° C., following two crystallizations from benzene.

Utilizing the foregoing procedure, the compounds named below are obtained from the following reactions:

(a) From the reaction of 2.43 g. of α-methyl-3-(2-thienyl)benzo[b]thiophene-7-acetic acid with 1.14 g. of sulfuryl chloride in 25 ml. of acetic acid, there is obtained 3-(5-chloro - 2 - thienyl)-α-methylbenzo[b]thiophene-7-acetic acid.

(b) From the reaction of 2.43 g. of α-methyl-7-(2-thienyl)benzo[b]thiophene-4-acetic acid with 1.14 g. of sulfuryl chloride in 25 ml. of acetic acid, there is obtained α-methyl-7-(5-chloro - 2 - thienyl)benzo[b]thiophene-4-acetic acid.

EXAMPLE 8

A mixture consisting of 36.7 g. of α-methyl-7-(2-thienyl)benzo[b]thiophene-4-acetic acid, 17.1 g. of N-bromosuccinimide, 100 mg. of dibenzoyl peroxide, and 250 ml. of chloroform is heated under reflux for two hours while being irradiated by a floodlight. Upon cooling, the mixture is filtered and the filtrate is washed with 5% aqueous sodium hydroxide and with water until neutral, dried, and evaporated to dryness under reduced pressure to give a residue of α-methyl-7-(5-bromo-2-thienyl)benzo[b]thiophene-4-acetic acid.

What is claimed is:

1. A member of the class consisting of (2-thienyl)-benzo[b]thiopheneacetic acid compounds that are represented by the formula

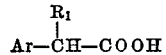

and pharmaceutically-acceptable salts thereof; where $R_1$ is hydrogen or methyl and Ar represents a member of the class consisting of a 3-(2-thienyl)benzo[b]thiophene-7-group having the formula

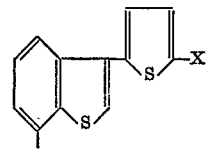

a 4-(2-thienyl)benzo[b]thiophene-7-group having the formula

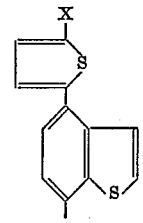

and a 7-(2-thienyl)benzo[b]thiophene-4-group having the formula

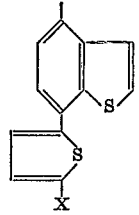

where X is hydrogen, bromine, or chlorine.

2. A compound according to claim 1 which is 7-(2-thienyl)benzo[b]thiophene-4-acetic acid.

3. A compound according to claim 1 which is α-methyl-7-(2-thienyl)benzo[b]thiophene-4-acetic acid.

4. A compound according to claim 1 which is 3-(2-thienyl)benzo[b]thiophene-7-acetic acid.

5. A compound according to claim 1 which is α-methyl-3-(2-thienyl)benzo[b]thiophene-7-acetic acid.

6. A compound according to claim 1 which is 4-(2-thienyl)benzo[b]thiophene-7-acetic acid.

References Cited
UNITED STATES PATENTS
3,558,655   1/1971   Kaltenbronn _____ 260—330.5

HENRY R. JILES, Primary Examiner

R. T. BOND, Assistant Examiner

U.S. Cl. X.R.

424—275; 260—329 AM, 329 HS, 332.2 A, 332.3, 332.5